United States Patent Office 3,267,114
Patented August 16, 1966

---

3,267,114
4-ARYLSULFONYL URAZOLES
Milton Wolf, West Chester, Pa., assignor to American Home Products Corporation, New York, N.Y., a corporation of Delaware
No Drawing. Filed Dec. 1, 1965, Ser. No. 510,937
12 Claims. (Cl. 260—308)

This invention is directed to novel compounds classified in the art of organic chemistry as 4-arylsulfonylurazoles and to a process for making these compounds.

In its composition aspect, the claimed invention resides in a composition of matter consisting of a urazole nucleus having in the 4-position thereof a phenylsulfonyl substituent or its hereinafter disclosed equivalents.

Viewed in its process aspect, the claimed invention resides in the concept of reacting urazole with an arylsulfonyl halide.

The tangible embodiments of the composition aspect of this invention possess the inherent physical properties of being relatively high melting solids, and substantially insoluble in water.

Examination of compounds produced by the hereinafter described process reveals data confirming the molecular structure hereinbefore set forth. For example the nuclear magnetic resonance spectrum shows the environmental equivalence of the urazole atoms.

The aforementioned physical characteristics, taken together with the nature of the starting materials and the mode of synthesis positively confirm the structure of the compositions of the invention.

As determined by pharmacological evaluation using warm blooded animals, the claimed compounds exhibit the applied use characteristic of exerting qualitatively varying therapeutic effects as diuretics, analgesics and central nervous system depressants.

The process and the compounds of the claimed invention are further elucidated in the following reaction scheme:

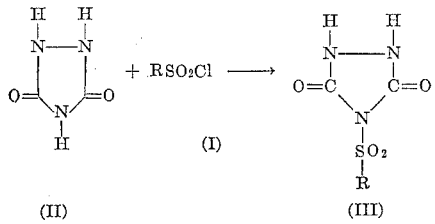

wherein R is a phenyl, substituted phenyl, heteroaryl, or aralkyl group.

As shown above, the reaction, whereby the claimed compounds are produced, entails forming an aqueous suspension of urazole (II) with a strong base such as NaOH. To this solution is added portionwise, with cooling and agitation, a solution of a phenylsulfonyl halide (I) in tetrahydrofuran. Stirring is continued, and the temperature is allowed to rise to room temperature. After this time, water is added to the reaction mixture in order to precipitate the product, which can be purified by recrystallization from ethyl acetate.

The urazole and the phenylsulfonyl halides used in making the claimed compounds are generally known or are readily prepared by procedures well known to those skilled in the art.

Equivalent arylsulfonyl halides are the derivatives thereof having, on any convenient position on the aryl ring, one or more substituents such as alkyl; alkoxy having up to 5 carbon atoms aryloxy such as benzyloxy; nitro or acylamido groups; halogen atoms such as chlorine or fluorine; and haloalkyl substituents such as trifluoromethyl. Similarly, heteroalkyl sulfonyl halides, such as 2-thiophenesulfonyl chloride, can be used.

From the above discussion of the starting materials, it will be noted that, correspondingly, the claimed compounds can bear the enumerated substitutents. Such substituted compounds are the full equivalents of the compounds specifically claimed herein, and can be used for the same purposes.

The following examples set forth the best mode contemplated by the inventor for carrying out his invention. The examples are further given by way of illustration and are not to be construed as limitations of the present invention, many variations of which are possible without departing from the scope and spirit thereof.

Example I

To a suspension of 5 g. of urazole in 30 ml. of water was added 2 g. of sodium hydroxide. The solution was stirred and cooled in an ice-bath, and a solution of 9.4 g. of p-toluenesulfonyl chloride in 20 ml. of tetrahydrofuran was added dropwise (30 min.). Stirring was continued for 1 hour, and the temperature was allowed to rise to room value. Water (100 ml.) was added, and the solid so obtained was collected, washed with water (150 ml.) and dried to afford 7.4 g. of 4-p-tolylsulfonylurazole, which after recrystallization from ethyl acetate gave 4.3 g. of colorless needles, M.P. 211–212° dec.

Elemental analysis confirmed the empirical formula for $C_9H_9N_3O_4S$.

In a manner similar to that of Example I, the following arylsulfonylurazoles were prepared:

| Ex. | Starting Material | 4-Substituent | Recrystallization Solvent | M.P., degrees |
|---|---|---|---|---|
| II | Benzenesulfonyl chloride | Phenylsulfonyl | Ethanol-water | 205–207 |
| III | α-Toluenesulfonyl chloride | Benzylsulfonyl | Ethanol-hexane | 223 |
| IV | p-Nitrobenzenesulfonyl chloride | p-Nitrophenylsulfonyl | Ethyl acetatehexane | 218–219 |
| V | o-Nitrobenzenesulfonyl chloride | o-Nitrophenylsulfonyl | Ethyl acetate hexane | 188–190 |
| VI | p-Acetamidobenzenesulfonyl chloride | p-Acetamidophenylsulfonyl | 1,2-dimethoxyethane | 223 |
| VII | p-Bromobenzenesulfonyl chloride | p-Bromophenylsulfonyl | Ethanol-water | 183 |
| VIII | 2-thiophenesulfonyl chloride | 2-thienylsulfonyl | 1,2-dimethoxyethane | 217.5 |
| IX | m-Trifluoromethylbenzenesulfonyl chloride | m-Trifluoromethylphenylsulfonyl | Ethyl acetate-hexane | 195 |
| X | p-Methoxybenzenesulfonyl chloride | p-Anisylsulfonyl | 1,2-dimethoxyethane | 181 |
| XI | 4-chloro-3-nitrobenzenesulfonyl chloride | 4-chloro-3-nitrophenylsulfonyl | Ethanol-water | 228 |
| XII | p-Chlorobenzenesulfonyl chloride | p-Chlorophenylsulfonyl | 1,2-dimethoxyethane | 187 |

When the compounds of the invention are employed as diuretics, analgesics and central nervous system depressants, they may be administered alone or in combinations with pharmaceutically acceptable carriers, the proportion of which is determined by the solubility and chemical nature of the compound, chosen route of administration, and standard pharmaceutical practice. For examples, they may be administered orally in the form of tablets or capsules containing standard excipients, or in the form of solutions; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 40 mg. to about 2 gm. per kg. of body weight per day, although as aforementioned, variations will occur. However, a dosage level that is in the range of from about 100 mg. to about 1.25 gm. per kg. of body weight per day is most desirably employed in order to achieve effective results.

I claim:

1. A urazole compound of the formula:

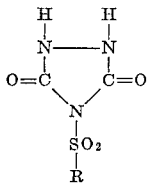

wherein R is selected from the group consisting of thienyl, and phenyl moieties of the formula:

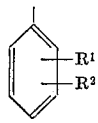

wherein $R^1$ and $R^2$ are each selected from the group consisting of hydrogen, lower alkyl, nitro, acetamido, halo, trihalomethyl and lower alkoxy.

2. A compound as defined in claim 1 which is:

4-phenylsulfonylurazole

3. A compound as defined in claim 1 which is:

4-p-anisylsulfonylurazole

4. A compound as defined in claim 1 which is:

4-p-tolylsulfonylurazole

5. A compound as defined in claim 1 which is:

4-p-chlorophenylsulfonylurazole

6. A compound as defined in claim 1 which is:

4-p-bromophenylsulfonylurazole

7. A compound as defined in claim 1 which is:

4-o-nitrophenylsulfonylurazole

8. A compound as defined in claim 1 which is:

4-p-acetamidophenylusufonylurazole

9. A compound as defined in claim 1 which is:

4-(2-thienylsulfonyl)urazole

10. A compound as defined in claim 1 which is:

m-trifluoromethylphenylsulfonylurazole

11. A compound as defined in claim 1 which is:

4-(4-chloro-3-nitrophenylsulfonyl)urazole

12. A compound as defined in claim 1 which is:

4-benzylsulfonylurazole

No references cited.

ALEX MAZEL, *Primary Examiner.*

ALTON D. ROLLINS, *Assistant Examiner.*